Figure 1:
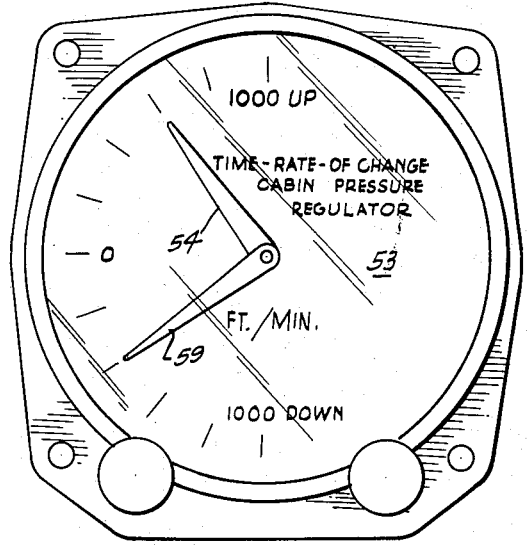

Dec. 1, 1953

B. E. DEL MAR 2,660,942

RATE OF PRESSURE CHANGE REGULATING INSTRUMENT

Original Filed May 13, 1946

INVENTOR.
BRUCE E. DEL MAR
BY
*J. Edwin Coates*
-ATTORNEY-

Patented Dec. 1, 1953

2,660,942

UNITED STATES PATENT OFFICE 2,660,942

RATE OF PRESSURE CHANGE REGULATING INSTRUMENT

Bruce E. Del Mar, Los Angeles, Calif., assignor to Douglas Aircraft Company, Inc., Santa Monica, Calif.

Original application May 13, 1946, Serial No. 669,366. Divided and this application March 26, 1951, Serial No. 217,534

14 Claims. (Cl. 98—1.5)

This invention relates to pressure regulating instruments and more particularly to such an instrument for regulating the time-rate-of-pressure-change especially useful in systems for controlling the pressure of the air of pressurizable aircraft cabins.

This application is a division of my copending application Serial No. 669,366, filed May 13, 1946, now Patent No. 2,549,673. In the pressure regulating system therein shown, as in substantially all such systems, the absolute pressure within the cabin is varied by controllably varying the rate of air discharge from the cabin relative to the rate of air delivery to the cabin. The air delivered to the cabin is furnished by superchargers or like blowers which are capable of delivering air to the cabin at a pressure greater than ambient flight pressure. In such systems the rate of air discharge is varied by valve means, the position of which is controlled by a suitable operating means regulating the flow of vitiated air through an opening formed in the cabin wall.

Considerable development has been undertaken in the past toward providing means to controllably vary the pressure in aircraft cabins along certain predetermined schedules which would not produce discomfort to the passengers. Cabin pressure control systems as first evolved, in this country particularly, were systems which maintained cabin absolute pressure substantially constant at some intermediate pressure altitude substantially lower than the pressure altitude at which the aircraft was intended to be operated. This control of cabin pressure achieved the result of permitting aircraft to be flown at altitudes at which the oxygen content of the air is not sufficient to maintain passengers and crew, but yet did little in isolating passengers and crew from the rather rapid changes in pressure during the ascents and descents in the lower altitudes where the air is most dense and where the pressure thereof changes most rapidly with changes in altitude.

Rates of ascent and descent of the aircraft were, therefore, previously limited to a large extent by the tolerance of the crew and passengers to rates of pressure change within the cabin produced by the ascent and descent of the aircraft. As modern commercial airplanes are capable of more rapid altitude change than can comfortably be tolerated by the average passenger, previous systems were proposed which limited the time-rate-of-pressure-change within the cabin to some tolerable rate regardless of the rate of ascent and descent of the aircraft. Such a system is disclosed and claimed in the copending Klemperer application, Serial No. 437,921, now Patent No. 2,549,690. Although the system there shown and claimed included a time-rate-of-pressure-change regulatory instrument, the instrument was not sufficiently versatile for use in the more complicated control systems evolved subsequent to the development of the invention of this application.

The instrument of the present invention obviates the difficulties had with previously proposed control systems by providing means for not only limiting the time-rate-of-pressure-change within the cabin as effected by control instruments forming a part of the system, but also provides means by which the instrument of the present invention can be used as the primary control of cabin pressure to produce a controlled rate of pressure change within the cabin. The instrument may be used at all times as a primary control instrument to effect a time-rate-of-pressure-change within the cabin regardless of the flight path of the aircraft. Thus, for example, if the aircraft is to take off from an airfield having a pressure altitude of approximately 500 feet above sea level and the next scheduled landing field has a pressure altitude of approximately 5000 feet altitude, the instrument can be used to bring about a gradual decrease in cabin pressure from the pressure of the first landing field to the pressure at the second landing field even though the plane may be flown at relatively high altitudes in order to fly over mountain terrain along the flight path between the two airports.

On the other hand the instrument of the present invention can be so used that it merely vetoes or limits the action sought to be effected by other control instruments in the system. The means used to effect the two uses of the instrument of the present invention are simple in structure and not likely to fail in use. The pressure schedule furthermore is easily brought about by the operator of the instrument and is automatically controlled once the instrument has been set by the operator.

Figure 2:
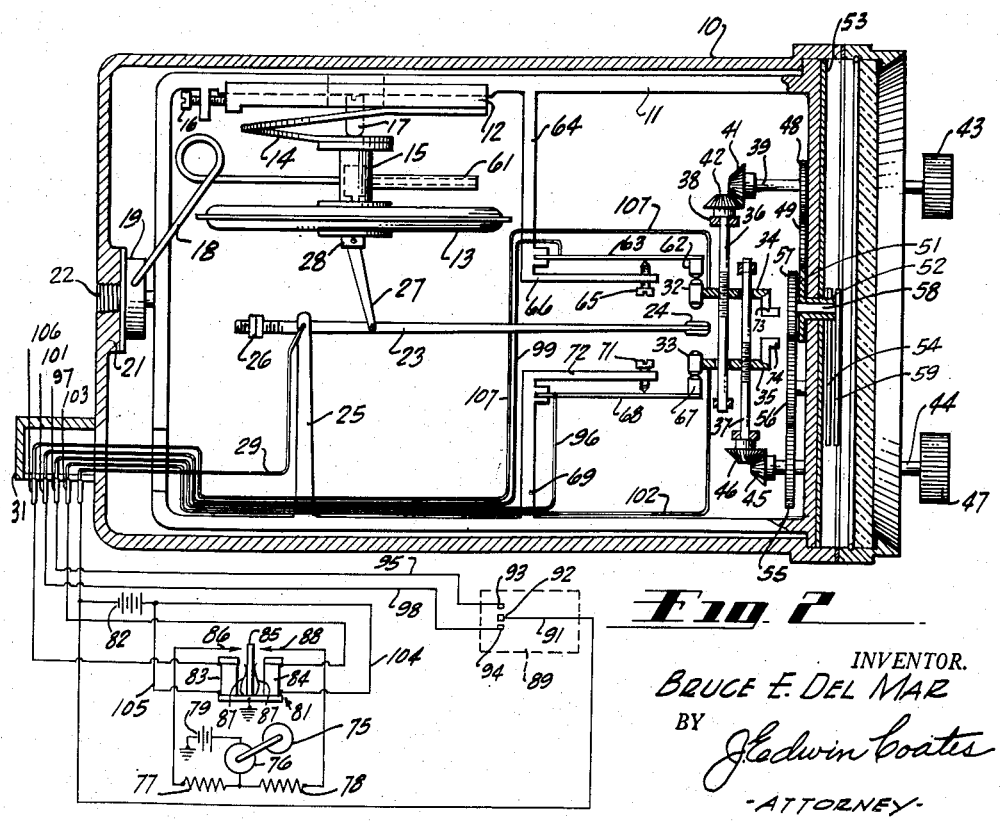

Other features and advantages of the invention will be readily understood from the following detailed description taken with the accompanying drawing, in which:

Figure 1 is a view showing the dial face of the instrument of the present invention; and Figure 2 is a sectional view of the instrument to more clearly illustrate certain elements of the instrument together with a schematic view of one form of a control system with which the instrument of the present invention can be used.

The cabin pressure regulator of the present invention, referring now to the drawing and more particularly to Figure 2 thereof, comprises a hermetically sealed case 10 in which is mounted a rigid supporting frame 11. A support element 12 is slidably mounted on the frame 11 for adjustably positioning a pressure capsule assembly 13 carried thereby. The capsule assembly 13 is attached to the support element 12 by means of an adjustable support ring 14 and a hollow spool 15. An adjustment screw 16 permits longitudinal adjustment of the support element 12 and the capsule assembly 13 with respect to the frame 11. A second screw 17 threadedly mounted in the support element 12 provides means for vertically adjusting the position of the capsule assembly 13 as viewed in Figure 2.

The interior of the spool 15 communicates directly with the interior of the capsule assembly 13 and through a conduit 18 with a hollow fitting 19 mounted to a boss 21 formed on the one wall of the case 10. The boss is formed with a tapped opening 22 for receiving the threaded end of a conduit, not shown, but leading to the interior of the cabin. It will thus be seen that the interior of the capsule assembly 13 is subject to cabin absolute pressure.

A control arm 23, carrying at one end thereof a contact 24, is pivotally mounted adjacent the opposite end thereof to a finger 25 integrally formed with the frame 11. To counterbalance the arm 23, a weight 26 having a tapped opening therethrough is threadedly mounted to the end of the arm opposite to the contact 24. A link 27 pivotally interconnects an intermediate portion of the control arm 23 and the movable end of the capsule assembly 13, the link being pivotally connected at one end to the arm and at the opposite end to a lug 28 carried by the movable end of the capsule assembly.

The control arm 23 is electrically connected by a lead 29 to a receptacle 31 mounted on the one wall of the case 10 and adapted to receive a suitable attachment cap, not shown, but including leads for electrically connecting the instrument of the present invention into a circuit for controlling the position of the outlet valve through which vitiated air is discharged from the cabin.

The control arm 23 is so mounted within the instrument case that the contact 24, carried at the one end thereof, is movable between a pair of contacts 32 and 33 insulatedly carried by arms 34 and 35, respectively. The arm 34 carrying the contact 32 is formed with a tapped opening threadedly receiving a shaft 36 while the arm 35 is mounted in the same manner to a threaded shaft 37. The shafts 36 and 37 are journaled in suitable bearings 38 supported on fingers, not shown, but which are formed integral with the supporting frame 11. Rotation of the shaft 36 and consequent adjustment of the arm 34 and contact 32 is brought about by a shaft 39 rotatably supported on the frame 11 and carrying at the inner end thereof a gear 41 of a bevel gear set, the other gear 42 of which is carried by the upper end of the shaft 36.

The shaft 39 carries at the outer end thereof a knurled knob 43 to permit the shaft 39 to be rotated to bring about the desired adjustment of the contact 32. This is so, for it will be seen that as the knob 43 is rotated the contact 32 will be moved in one direction or the other depending upon the direction of rotation of the knob 43.

The contact 33 carried by the arm 35 is also adjustable with respect to the control arm 23 by a shaft 44 suitably journaled on the frame 11 and carrying at its inner end a gear 45 of a bevel gear set, the other gear 46 of which is fixedly mounted to the lower end of the threaded shaft 37 on which the arm 35 is mounted. As in the operation of the adjustment of contact 32, rotation of the knob 47 fixed to the outer end of the shaft 44 will bring about rotation of the shaft 37 and consequent movement of the contact 33.

The shaft 39 carries, intermediate the ends thereof, a gear 48 which through an idler gear 49 drives a pinion 51. The pinion 51 is carried by a hollow shaft 52 rotatably supported on the frame 11 and extended through an opening formed in a dial 53 carried by the frame 11 of the instrument. The shaft 52 supports at the outer end thereof a hand or needle 54 which serves as an index means for graduations, referring now to Figure 1, suitably formed about the dial 53. It should now be seen that manipulation of the knob 43 adjusts the position of the contact 32 and simultaneously sets the hand 54 relative to the scale of the dial 53.

The shaft 44 carries a gear 55 which, through an idler gear 56, drives a pinion 57 carried by a shaft 58 coaxially mounted within the hollow shaft 52. The shaft 58 carries at its outer end projecting beyond the hollow shaft 52 a hand or needle 59 which, like the needle or hand 54, serves as an index means for the graduations formed on the front face of the dial 53.

Actually, as will be hereinafter shown, contact 32 controls the time-rate-of-cabin-pressure-decrease during ascent so that the hand 54 indicates, in connection with the graduations of the dial 53, the time-rate-of-decrease of cabin absolute pressure for any given setting of the contact 32. The contact 33, on the other hand, controls the time rate of increase of cabin absolute pressure during descent of the aircraft so that the hand 59 indicates a time-rate-of-change during descent.

The pressure capsule assembly 13 actually is a means responsive to the time-rate-of-change of cabin absolute pressure for the interior of the case 10 communicates with the cabin through a small capillary tube 61 carried by the spool 15 and communicating with the interior thereof. It will be remembered that the interior of the spool 15 communicates with the cabin by way of the conduit 18 and directly with the interior of the capsule assembly 13. As the interior of the case 10 communicates with cabin absolute pressure only through the capillary tube 61, decrease in cabin pressure will produce contraction of the capsule assembly 13 and consequently clockwise movement of the control arm 23. On the other hand, if cabin absolute pressure is increasing, the capsule assembly 13 will expand and in expanding will move control arm 23 in a clockwise direction.

In accordance with conventional practice in aircraft rate of climb instruments, the capillary tube 61 may be of or filled with a material which increases its restriction to air flow in accordance with reduced air densities so that whenever so desired, compensation may be obtained to permit relatively large deflections of the control arm 23 for any given pressure difference at high altitudes.

When so compensated, a given control arm deflection corresponds directly to a constant value of altitude change. Furthermore, a temperature compensation means may be provided, as conventional in present day aircraft rate-of-climb instruments.

The zero time-rate-of-pressure-change position of contact 32 is such that a very slight clearance is had between the same and the contact 24 when the control arm 23 is in its zero rate-of-pressure-change-position. A contact 62 is carried at the free end of a resilient finger 63 which in turn is supported by an arm 64 integrally formed with the frame 11. The finger 63 normally holds the contact 62 in engagement with contact 32 in all positions of the latter from just beyond its zero time-rate-of-pressure-change position into the climb range of control arm 23.

Upon adjustment of contact 32 to its zero time-rate-of-pressure-change position and into the descent range by proper manipulation of the knob 43, the engagement between contacts 32 and 62 is broken by an adjusting screw 65 threadedly mounted in a tapped opening formed in a lug 66 carried by the lower end of the arm 64 and extending substantially normal thereto. It can be pointed out here that the contact 32 can be moved into a descent range by operation of the knob 43 sufficient to force the contact 32 into engagement with the contact 24 to forcibly distend the pressure capsule assembly 13.

The zero time-rate-of-pressure-change position of contact 33 is also such that a very slight clearance is had between the contact 24 when the control arm 23 is in the zero pressure change position. A contact 67 similar to contact 62 is carried at the one end of a resilient finger 68, the opposite end of which is fixed to an arm 69 integrally formed with the frame 11. The resilient finger 68 is so positioned that for all positions of the contact 33 from just beyond its zero time-rate-of-pressure-change position into the descent range of control arm 23, engagement is maintained between contacts 33 and 67. Upon adjustment of the contact 33 by manipulation of the knob 47 to its zero position or anywhere into the climb range, this engagement is broken by the adjusting screw 71 adjustably mounted in a lug 72 extending substantially normal from the arm 69 at the free end thereof. It will be seen again that if contact 33 is moved into the climb range, it will move into engagement with contact 24 and forcibly collapse the pressure capsule assembly 13.

Although contacts 32 and 33 are movable throughout a wide range of movement, insulated stops 73 and 74, carried respectively by arms 34 and 35, are provided to limit movement of the contacts 32 and 33 toward each other, and in the now preferred embodiment of the invention, these two contacts can be brought together only to a position in which they are separated a distance slightly greater than the thickness of the contact 24 carried by the control arm 23.

To illustrate the operation of the control instrument of the present invention, there is shown in Figure 2 a schematic illustration of one form of control circuit with which the instrument may be used. The cintrol circuit there shown is one for controllably operating a discharge valve 75 which controls the rate of air discharge from the cabin. The control circuit comprises a motor 76 which, through a suitable gear train, not shown, operates the valve 75 to control the rate of air discharge from the cabin. The motor is reversible and may be energized either through a field coil 77 or 78 by power from some suitable source such as a battery 79 to drive the valve 75 in alternate directions depending upon the direction of rotation of the motor 76.

Automatic control of the valve 75 is effected through a control relay 81 which as shown for illustrative purposes is actually a power amplifier in which very small currents from a battery 82 can be used to selectively energize the coil 83 or 84 of the relay 81 to control a flow of relatively large current in the circuits of the motor field coils 77 and 78.

It is not believed necessary to now describe in detail the various conductors of the motor control circuit, and it will be seen that energization of the relay coil 83 will cause the armature 85 of the relay 81 to move to the left, as viewed in Figure 2, and into engagement with a contact 86 against the action of one of a pair of centering springs 87 to complete a circuit from the battery 79 through the circuit of the field coil 77. Energization of this field coil produces such directional rotation of the motor 76 as to drive the valve toward closed position to decrease the rate of air discharge from the cabin.

On the other hand energization of relay coil 84 causes the armature 85 of the relay 81 to move to the right, as viewed in Figure 2, and into engagement with contact 88 against the action of the other of the pair of centering springs 87 to complete a circuit from the battery 79 through the circuit of the field coil 78. Completion of this circuit, as should now be understood, causes the motor 76 to drive the valve 75 in opposite direction, that is toward open position, to increase the rate of air discharge from the cabin.

In the schematic control system forming a part of Figure 2, energization of the relay 81 is in part controlled by a pressure control instrument schematically shown at 89. The control instrument schematically shown at 89 may comprise any control instrument desired which will regulate cabin pressure along some preselected or desired pressure schedule as the aircraft is flown at altitudes to which pressurization is required.

This control instrument could comprise the regulator 58 of my copending application above identified and in one use thereof will act to so control the valve 75 as to maintain cabin pressure substantially constant. This instrument comprises a pivotally mounted control arm 91, the position of which is varied by coacting pressure responsive elements, not shown, to the end that a contact 92 carried by the control arm 91 is movable between and into engagement with one or the other of contacts 93 and 94. Contact 93 is to be connected by a lead 95 to a conductor 96 which electrically interconnects the contact 67 and a prong 97 of the receptacle element 31 to which the lead 95 is to be connected. The contact 94 is to be connected by a lead 98 to a prong 101 of the receptacle 31 which in turn electrically interconnects the prong and the contact 62. It will thus be seen that so long as contact 67 is in engagement with contact 33, movement of the control arm 91 such as to move contact 92 into engagement with the contact 93, will complete a circuit from the battery 82 through the relay coil 84. This is so for contact 33 is connected by a conductor 102 to a prong 103 of the receptacle 31 which is to be electrically connected to a lead 104 in which the relay coil 84 is electrically connected.

On the other hand, movement of the contact 92 into engagement with contact 94 completes a circuit from the battery 82 through the relay coil 83 so long as contact 32 is held in engagement with contact 62. Here it will be seen that current will flow from the battery 82 by way of the lead 105, in which coil 83 is electrically connected to prong 106 of the receptacle 31, conductor 107, contacts 62 and 32, conductor 99, pin 101 of the receptacle 31, and thence to ground by way of the instrument 89.

In this operation of the instrument of the present invention the control instrument 89 is operative to control movement of the valve 75 to effect a desired schedule of cabin pressure as the aircraft ascends and descends. So long as the control action effected by instrument 89 does not produce within the cabin a time-rate-of-pressure-change in excess of the predetermined maximum rate, the control instrument of the present invention is passive.

Should the control instrument 89 seek to produce such a change in cabin pressure as to produce within the cabin a time-rate-of-pressure-change in excess of the predetermined rate, the instrument of the present invention will, as the control arm 23 moves the contact 24 into engagement with either contact 32 or 33, depending upon whether cabin pressure is increasing or decreasing, result in such control action over the motor 76 as to prevent further movement of the valve 75 in the direction producing the excessive rate of pressure change. This is so, for if control instrument 89, for example, sought to effect a control of cabin pressure such as to rapidly increase the same (contact 92 engaging contact 94), relay coil 83 would be energized and the valve 75 would be moved toward closed position to produce such a pressure change as to expand pressure capsule 13 and thus move contact 24 into engagement with contact 33. It will be remembered that engagement between contacts 24 and 33 energizes the circuit including conductors 96, 102, and 104 and brings about energization of relay coil 84. Once relay coil 84 is energized, the armature 85 is moved to its center position by the centering springs 87, thus de-energizing the motor 76 to arrest movement of the valve 75 and consequently prevent an increase in the rate of air discharge.

So long as the control instrument 89 seeks to effect such a control as to bring about a time-rate-of-pressure-change in excess of the predetermined rate, the instrument of the present invention will block or veto this control action. As previously explained, this results in simultaneous energization of both relay coils to prevent movement of the valve 75 from its position, which brought about the rate of air discharge sufficient to produce the time-rate-of-pressure-change in excess of the preselected rate.

It will thus be seen from the foregoing explanation that as long as contacts 62 and 67 are held in engagement, respectively, with contacts 32 and 33, the instrument of the present invention serves merely as a blocking or vetoing instrument to limit the time-rate-of-pressure-change within the cabin to some preselected rate.

The limiting rate of pressure change within the cabin is, as should now be understood, determined by the position of the contacts 32 and 33. It has been previously explained that the position of these two contacts can be pre-set at will by manual operation of the control knobs 43 and 47. Actuation of either one of these knobs also produces, it will be remembered, movement of the hands 54 and 59 over the dial 53 to indicate the set rate to the pilot.

The instrument is capable of a use wherein the same serves as a primary control instrument and the control instrument 89 becomes a vetoing or limiting instrument. If, for example, the aircraft was to take off from an airport having a pressure altitude of 500 feet and the next scheduled landing field had a pressure altitude of 5000 feet and a time-rate-of-pressure-change schedule during flight between the two air fields was desired, the pilot or flight engineer by manipulation of the knob 47 would move contact 33 from a position within the descent range of the contact to some position beyond the zero change position of the control arm 23. Such adjustment of the contact 33 would move the same out of engagement with contact 67 and thus interrupt the circuit controlled by contact 93 of the control instrument 89. It will be remembered that this circuit controls energization of relay coil 84 which, when energized, results in opening movement of the valve 75. Movement of the contact 33 into the climb range of control arm 23 would, of course, result in engagement between contact 33 and contact 24 to bring about energization of the control circuit formed by conductor 29, control arm 23, conductor 102, and conductor 104, thereby resulting in energization of relay coil 84. Energization of this coil causes such operation of the motor 76 as to drive valve 75 toward open position.

As the aircraft ascended from the landing field and climbed at a rate which would produce within the cabin a time-rate-of-pressure-change less than the preselected rate, as determined by the position of contact 32, relay coil 84 would remain energized to maintain the valve 75 in an open position. With valve 75 open the rate of pressure change within the cabin would, of coure, follow the pressure altitude change of the aircraft. If, however, the aircraft ascended at such a rate as to produce within the cabin a time-rate-of-pressure-change in excess of the preselected rate, control arm 23 would move contact 24 out of engagement with contact 33, thereby de-energizing relay coil 84, and into engagement with contact 32 to bring about energization of relay coil 83. Relay coil 83, once energized, will produce energization of the motor field circuit 77 resulting in such directional operation of the motor 76 as to drive the valve 75 toward closing position. Movement of the valve 75 toward closing position would immediately decrease the time-rate-of-pressure-change within the cabin and the increasing pressure within the capsule 13 would, at some value, move control arm 23 out of engagement with contact 33 to bring about cessation of movement of the outlet valve 75. As the aircraft continued to ascend, even to altitudes in excess of 5000 feet, the instrument of the present invention would continue to act as a primary control instrument to hold the time-rate-of-pressure-change within the cabin to the preselected rate.

If the pilot, because of mountainous terrain, was forced to fly the aircraft at an altitude higher than the 5000 feet altitude of the next scheduled landing field so that under the control of the instrument of the present invention, cabin absolute pressure became less than the absolute pressure of the 5000 feet landing field, the pilot or flight engineer, while he was still over the mountainous terrain, could by adjustment of the control knobs 43 and 47 first, move contact 33 to some preselected descent position and next, move contact 32 beyond the zero pressure change position of control arm 23 and into the descent range, bring about a preselected time-rate-of-pressure-increase within the cabin so that cabin absolute pressure would gradually increase as the aircraft was flown at altitudes greatly in excess of 5000 feet toward the next scheduled landing field. This would permit the aircraft to descend to the landing field beyond the mountainous terrain at a very rapid rate without discomfort to the passengers.

In this operation of the instrument, the moment contact 33 was moved to its preselected position within the descent range, and contact 32 was moved beyond the zero pressure change position of the control arm 23, the relay coil 83 would be energized to initiate movement of the valve 75 toward closing position. This would result in a gradual increase in cabin pressure, that is, an apparent descent of the cabin even though the aircraft may continue to fly in level flight or increase its altitude. If, however, under this influence the rate-of-pressure-change within the cabin tended momentarily to exceed the time-rate-of-pressure-increase determined by the position of contact 33, the control arm 23, under the influence of the expanding capsule 13, would bring about engagement of contacts 24 and 33 to result in opening movement of the valve to decrease the time-rate-of-pressure-change and thereby hold it at the preset descent rate.

It should thus be seen that control arm 23, under the urging of pressure capsule 13, will tend to move between and into engagement with contacts 32 and 33 to bring about an increase in cabin pressure along a preselected time-rate-of-pressure-change-schedule so that as the aircraft is flown toward the next scheduled landing field, the rate of pressure change within the cabin will be maintained at the rate selected by the pilot or flight engineer.

It might be shown here that the control instrument 89 can be used with the instrument of the present invention, when the latter is being operated as the primary control instrument, to act as a limiting instrument. If, for example, the control instrument 89 was one which could be used to maintain cabin absolute pressure constant at some preselected value, as, for example, 5000 feet, this instrument will veto or limit the action of the rate of climb control instrument of the present invention as soon as cabin absolute pressure reached the preselected pressure value of 5000 feet. Thus, if in the example just explained where the aircraft is to take off from a landing field having a pressure altitude of 500 feet, the ascent rate had been set just after takeoff to permit the cabin to reach 5000 feet at a time estimated to be just prior to the landing at the airport at 5000 foot altitude, the instrument 89 could be set to take over the control of the valve 75 once the apparent cabin altitude equaled 5000 feet. The control instrument 89 would, at that pressure value, move control arm 91 into engagement with contact 94 to tend to bring about closing movement of the valve 75 in opposition to any control action by the instrument of the present invention tending to open the valve.

If, at the time contact 92 was moved into engagement with contact 94, contact 24 was engaging contact 33, the armature 85 of the relay would assume its neutral or balanced position and all movement of the valve 75 would cease. As contact 92 would move into engagement with contact 94 as the apparent pressure altitude of the cabin became 5000 feet, cabin absolute pressure would tend to be held substantially constant throughout the remainder of the flight. If the aircraft had not completed its flight over the mountainous terrain or had not completed its descent to 5000 feet, the control instrument 89 would continue to act together with instrument of the present invention to hold cabin absolute pressure at approximately 5000 feet apparent altitude.

It should now be seen that the instrument of the present invention will act to either limit the rate of cabin pressure change to some preselected rate regardless of the control action of other instruments in the system seeking to bring about a cabin pressure change or control cabin pressure to change at a preselected rate. Thus, whether the instrument is used as a limiting instrument or as a primary control instrument, the same will protect the passengers from uncomfortable pressure changes during flight of the aircraft.

Although the instrument of the present invention has been herein shown and described as an instrument controlling an electrical power system for driving the discharge valve, it should be obvious that other types of motivating systems could be used, such as hydraulic or pneumatic, as the particular type of system is not important to the invention herein disclosed.

Although the now preferred embodiment of the present invention has been shown and described herein, it is to be understood that the invention is not to be limited thereto, for it is susceptible to changes in form and detail within the scope of the appended claims.

I claim:

1. A pressure regulating device for use in a system for regulating pressure within an aircraft cabin, comprising: a sealed housing; a pressure sensitive capsule mounted within said housing; conduit means leading from said cabin to the interior of said capsule whereby the capsule is subject internally to changes in cabin pressure; restricted communication means between said conduit means and the interior of said housing whereby said capsule is subject externally to housing pressure; a pair of spaced contacts; means for mounting said contacts for independent movement toward and away from each other; a contact engaging member; means movably mounting said last named member between said contacts for movement from positions intermediate said spaced contacts into engagement with one or the other of said contacts; means interconnecting said contact engaging member and said capsule whereby the former is moved as said capsule expands and contracts in response to changes in the pressures to which it is subjected; a second pair of contacts; and resilient means for mounting a contact of said second pair of contacts adjacent a contact of said first pair of contacts whereby each of said first pair of contacts can be independently moved into engagement with the adjacent contact of said second pair of contacts.

2. A pressure regulating device for use in a system for regulating pressure within an aircraft cabin, comprising: a sealed housing; a pressure sensitive capsule mounted within said housing; conduit means leading from said cabin to the interior of said capsule whereby the capsule is subject internally to changes in cabin pressure; restricted communication means between said conduit means and the interior of said housing whereby said capsule is subject externally to housing pressure; a pair of spaced contacts; means for mounting said contacts for independent movement toward and away from each other; a contact engaging member mounted between said contacts for movement from positions intermediate said spaced contacts into engagement with one or the other of said contacts; means interconnecting said contact engaging member and said capsule whereby the former is moved as said capsule expands and contracts in response to changes in the pressures to which said capsule is subjected; a second pair of contacts; resilient means for mounting each of said second pair of contacts adjacent one of said first pair of contacts whereby each of said first pair of contacts can be independently moved into engagement with the adjacent contact of said second pair of contacts; and means, including manually operated means disposed exteriorly of said housing, for adjusting the position of each of said first pair of contacts.

3. A pressure regulating device for use in a system for regulating pressure within an aircraft cabin, comprising: a sealed housing to be mounted within the cabin; a pressure sensitive capsule; means for fixedly mounting one end of said capsule within said housing; conduit leading from the exterior of said housing to the interior of said capsule whereby the capsule is subject internally to changes in cabin pressure; restricted communication means between said conduit and the interior of said housing whereby said capsule is subject externally to housing pressure; a pair of spaced contacts; means for mounting said contacts for independent movement toward and away from each other; a contact engaging member; means for pivotally mounting one end of said member within said housing, the free end of said member being disposed between said contacts; means interconnecting the free end of said capsule to said member intermediate the ends thereof whereby the free end of said member is movable from positions intermediate said spaced contacts into engagement with one or the other of said contacts as said capsule expands and contracts in response to changes in cabin pressure in excess of the capabilities of the restricted communication to relieve the pressure within said housing; a second pair of contacts; and resilient means for mounting a contact of said second pair of contacts adjacent a contact of said first pair of contacts whereby each of said first pair of contacts can be independently moved into engagement with the adjacent contact of said second pair of contacts.

4. A pressure regulating device of the character described for use in a cabin pressure control system wherein one side of a source of E. M. F. is connected both to one side of a first electrically responsive means to raise the cabin pressure and to one side of a second electrically responsive means to lower the cabin pressure, with the other side of the source connected to a movable contact of a cabin-pressure control instrument having a first fixed contact for co-operation with the movable contact to raise the cabin pressure and a second fixed contact for co-operation with the movable contact to lower the cabin pressure, said device comprising: a first switch contact and a second switch contact spaced therefrom for connection respectively with said first and second fixed contacts of the instrument; a third switch contact and a fourth switch contact for connection respectively with the other sides of said first and second electrically responsive means, said third and fourth switch contacts being positioned between said first and second switch contacts for circuit-closing cooperation of the third switch contact with the first switch contact and for circuit closing co-operation of the fourth switch contact with the second switch contact; a movable switch member for connection with said other side of said source, said switch member being positioned between said third and fourth switch contacts, a sealed housing; a pressure-sensitive capsule mounted within said housing; conduit means leading from said cabin to the interior of said capsule whereby the capsule is subject internally to changes in cabin pressure; restricted communication means between said conduit means and the interior of said housing whereby said capsule is subject externally to housing pressure; and means operatively connecting said capsule with said switch member to move the switch member towards said third switch contact in response to contraction of the capsule and towards said fourth switch contact in response to expansion of the capsule.

5. A pressure regulating device as set forth in claim 4 in which said third and fourth switch contacts are adjustable with respect to their spacing from each other.

6. A pressure regulating device as set forth in claim 5 which includes means yieldingly urging said first and second switch contacts inward towards said third and fourth switch contacts respectively.

7. A pressure regulating device as set forth in claim 6 which includes means to limit inward yielding movement of said first and second switch contacts respectively.

8. A pressure regulating device as set forth in claim 7 in which said limiting means is adjustable.

9. A pressure regulating device as set forth in claim 4 in which said third and fourth switch contacts are adjustably spaced apart and which includes manually operable means to vary their spacing.

10. A pressure regulating device as set forth in claim 9 which includes indicating means responsive to variation in the spacing between said third and fourth switch contacts.

11. A pressure regulating device as set forth in claim 10 in which said indicating means comprises index means and an associated scale.

12. A pressure regulating device as set forth in claim 4 in which each of said third and fourth switch contacts is movable relative to the other and which includes two manually operable means connected thereto respectively to vary their relative positions.

13. A pressure regulating device as set forth in claim 12 which includes means operatively connected with said third and fourth switch contacts to indicate their relative positions.

14. A pressure regulating device as set forth in claim 13 in which said indicating means comprises two pointers on a dial.

BRUCE E. DEL MAR.

References Cited in the file of this patent
UNITED STATES PATENTS

| Number | Name | Date |
|---|---|---|
| 2,327,394 | Bevins | Aug. 24, 1943 |
| 2,445,335 | Philbrick et al. | July 20, 1948 |
| 2,463,487 | Widgery et al. | Mar. 1, 1949 |
| 2,549,673 | Del Mar | Apr. 17, 1951 |
| 2,549,690 | Klemperer | Apr. 17, 1951 |